(12) United States Patent
Stabel et al.

(10) Patent No.: US 7,668,282 B2
(45) Date of Patent: Feb. 23, 2010

(54) METHOD FOR ASSEMBLING A PRESSURIZED WATER REACTOR CORE, AND REACTOR CORE CONFIGURATION

(75) Inventors: Jürgen Stabel, Erlangen (DE); Mingmin Ren, Erlangen (DE)

(73) Assignee: Areva NP GmbH, Erlangen (DE)

( * ) Notice: Subject to any disclaimer, the term of this patent is extended or adjusted under 35 U.S.C. 154(b) by 1349 days.

(21) Appl. No.: 10/460,812

(22) Filed: Jun. 12, 2003

(65) Prior Publication Data
US 2004/0022344 A1 Feb. 5, 2004

Related U.S. Application Data

(63) Continuation of application No. PCT/EP02/05057, filed on May 8, 2002.

(30) Foreign Application Priority Data

May 18, 2001 (DE) ............................. 101 24 637
Sep. 14, 2001 (DE) ............................. 101 45 289

(51) Int. Cl.
*G21C 19/00* (2006.01)
(52) U.S. Cl. .................... 376/267; 376/260; 376/261; 376/263
(58) Field of Classification Search ................ 376/267, 376/260, 261, 263
See application file for complete search history.

(56) References Cited

U.S. PATENT DOCUMENTS

| | | | | |
|---|---|---|---|---|
| 3,048,532 A | * | 8/1962 | Thorp, II | 403/319 |
| 3,235,463 A | * | 2/1966 | Sankovich | 376/349 |
| 3,480,510 A | * | 11/1969 | Anthony | 376/219 |
| 3,834,986 A | * | 9/1974 | suvanto | 376/233 |
| 3,897,878 A | | 8/1975 | Peberdy | |
| 4,451,427 A | * | 5/1984 | Ross et al. | 376/267 |
| 5,008,068 A | * | 4/1991 | Straub | 376/230 |
| 5,812,624 A | | 9/1998 | Burfin et al. | 376/267 |

FOREIGN PATENT DOCUMENTS

| | | | | | |
|---|---|---|---|---|---|
| FR | 2603416 A | * | 3/1988 | | |
| JP | 54153986 A | | 12/1979 | | |
| JP | 55136995 | | 10/1980 | | |
| JP | 63-223590 | * | 9/1988 | | 376/267 |
| JP | 1178894 | | 7/1989 | | |
| JP | 02156191 A | | 6/1990 | | |
| JP | 02161390 A | | 6/1990 | | 376/267 |
| JP | 02201291 A | | 8/1990 | | |
| JP | 04204084 A | | 7/1992 | | |
| JP | 63-223590 | * | 9/1998 | | |

* cited by examiner

*Primary Examiner*—Rick Palabrica
(74) *Attorney, Agent, or Firm*—Laurence A. Greenberg; Werner H. Stemer; Ralph E. Locher (57) ABSTRACT

The core of a pressurized water reactor is assembled in such a way that if the fuel elements on the edge of the core are bent, these fuel elements are oriented such that the bending of the fuel elements points outwards in a convex manner. When the reactor is in operation, forces arise which increase the size of small gaps between the fuel elements at the expense of greater gaps and counteract the bending effect of the fuel elements.

6 Claims, 8 Drawing Sheets

METHOD FOR ASSEMBLING A PRESSURIZED WATER REACTOR CORE, AND REACTOR CORE CONFIGURATION

CROSS-REFERENCE TO RELATED APPLICATION

This application is a continuation of copending International Application No. PCT/EP02/05057, filed May 8, 2002, which designated the United States and was not published in English.

BACKGROUND OF THE INVENTION

Field of the Invention

The invention relates to a method of assembling a core of a pressurized water reactor which is to be put into operation after an operating break during which the core has been reloaded in accordance with a plan. During the operating break in particular spent fuel elements are removed, fuel elements which are only partially spent but which are defective are repaired and new fuel elements are provided for reloading the core. The invention also relates to a correspondingly reloaded reactor core.

In reloaded cores of this type, fuel elements with a low reactivity may be disposed at the edge of the core, i.e. at least in the outermost row or, if appropriate, in the two outer rows of fuel elements, in order to maintain a low level of neutrons which diffuse out of the core and are therefore lost to the task of maintaining the nuclear chain reaction and the generation of heat. This is referred to as low leakage loading. Therefore, in particular fuel elements which have already been irradiated in one of the preceding operating cycles, provided that these irradiated fuel elements are still reusable, are suitable for these fuel element positions at the edge of the core, since their fissile material which was introduced originally has been only partially consumed and they are not defective and have also not already been repaired.

Defects are produced, for example, by holes or similar damage to the cladding tubes of the fuel rods or to the spacers, the damaged fuel rods or spacers being replaced if repairs of this nature are still economically viable. Repairs are always expensive since, to protect the operating staff, they have to be carried out remotely underwater.

Irradiated fuel elements are generally also bent, a bent fuel element likewise being considered defective if there is a risk that at the end of the next operating cycle it will no longer be possible for the fuel element to be pulled out of the core (as a result of it becoming caught up against the fuel elements which closely adjoin it in the core assembly), or of it no longer being possible for control rods to be displaced inside the guide tubes of the fuel element without difficulty. An economic repair method allowing fuel elements bent in this way to be straightened again is not currently known.

A fuel element which is only partly spent and can no longer be repaired represents a significant economic loss. A core whose fuel elements are bent, furthermore, represents an economic loss even if the individual fuel elements are not yet defective; this is because the tight gaps between the adjacent fuel elements in the core assembly are selected with a view to high power and optimum utilization of the fuel and should be maintained accurately. This is only possible to a limited extent if the fuel elements are bent.

If the damage to fuel rods and spacers is caused by chemical problems (e.g. corrosion) or mechanical problems (e.g. friction against other components and/or foreign bodies which may have penetrated), new fuel elements are protected from this damage by improved materials, the incorporation of foreign-body filters, a changed configuration or similar measures. This increasingly allows reducing economic losses.

Bending may have various causes which have not hitherto been accurately clarified in detail (e.g. anisotropy of the thermal expansion or the radiation-induced growth in the length of the cladding tubes and/or control rod guide tubes or preferred directions in the cooling water flow), some materials and configurations for the spacers and guide tubes, including the way in which they are secured with respect to one another and the support for the fuel rods (i.e. for the "fuel element skeleton" in which the fuel rods are held) being less susceptible to bending of the fuel elements.

When a core is being reloaded, it is hoped that the use of fresh fuel elements with a low-bending skeleton of this nature will prevent the reused fuel elements which have already bent from bending further, which would require them to be replaced prematurely, and that a bent core may even straighten again if, after a plurality of reloading operations, an ever increasing number of the fuel elements have a low-bending skeleton of this type. Hitherto, however, it had been impossible to avoid the economic drawbacks which result from deviations in the actual gap width from the optimum configuration, and indeed these drawbacks are even increased initially, as will be described below.

Patent Abstracts of Japan for Patent Application No. JP 04-204 084 A discloses that the bending of a fuel assembly channel which has occurred in the last operating cycle at a defined location in the core may be described by a deformation vector and for the fuel element to be reused in the next cycle with its channel oriented in such a manner that the deformation vector of the irradiated fuel element is compensated for in the next cycle by a virtually identical bending in the opposite direction. However, even then unbent (fresh) fuel elements and fuel elements with different degrees of bending are disposed next to one another in the core, and therefore the conditions with respect to the spacing are disturbed compared to the optimum core configuration.

SUMMARY OF THE INVENTION

It is accordingly an object of the invention to provide a method for assembling a reactor core which overcomes the above-mentioned disadvantages of the heretofore-known methods of this general type and which substantially avoids the economic disadvantages which are attributable to a bending of the fuel elements of a core in a pressurized water reactor. It is a further object of the invention to provide a corresponding reactor core configuration.

With the foregoing and other objects in view there is provided, in accordance with the invention, a method for assembling a core of a reactor, the method includes the steps of:

providing irradiated fuel elements for a reactor core of a pressurized water reactor;

reusing the irradiated fuel elements in accordance with a given loading plan;

inserting bent ones of the irradiated fuel elements at an edge of the reactor core; and orienting the bent ones of the irradiated fuel elements inserted at the edge of the reactor core such that a respective maximum extent of a bending of the fuel elements is oriented toward an outer side of the reactor core.

In other words, according to the invention, in a method for assembling the core of a pressurized water reactor, fuel elements which can be reused in accordance with a predetermined loading plan are inserted at fuel element positioning for which irradiated and reusable fuel elements of this type are available, wherein reusable fuel elements which are bent and are inserted at the edge of the core are oriented in such a manner that the maximum extent of their bending lies on an outer side of the core.

In order to achieve the object of the invention, the invention deals with the way in which the core is assembled. As has already been mentioned, during such an assembly, fuel elements which have been irradiated and can be reused in accordance with a predetermined loading plan are inserted at fuel element positions for which irradiated and reusable fuel elements of this type are available. According to the invention, reusable fuel elements which are bent and are inserted at the edge of the core are in the process oriented in such a manner that the maximum extent of their bending lies on an outer side of the core.

With a core of this type, in which irradiated and bent fuel elements are inserted in fuel element positions at the edge of the core, therefore, according to the invention these elements at the edge are oriented in such a manner that the maximum extent of the their bending lies on an outer side of the core. Therefore, it is possible to ensure that in just a short time, substantially even in one cycle, a core which, before the reloading operation, contained relatively strongly bent fuel elements is practically straightened again. Therefore, the extent to which strongly bent fuel elements, which have already been irradiated for a plurality of cycles, are straightened corresponds to the reduction in forces which these fuel elements exert on and could use to bend fresh fuel elements or fuel elements which have scarcely been bent. Furthermore, those gaps between the fuel elements whose width is above the mean are reduced in size and gaps which are below the mean are increased in size. In the process, therefore, the gap width is approximated to the planned optimum.

The invention is based on the realization that with the structure of the conventional pressurized water reactors, a radially oriented force which decreases steadily from the center toward the edge is exerted on the fuel elements of the core by the flow. Furthermore, observations and measurements carried out on irradiated cores have made it possible to establish an interaction between the fuel elements and the cooling water which in the core assembly increases smaller gaps to the detriment of the larger gaps. Moreover, in the center of the core, the fuel elements appear to be practically "frozen", in the sense that they are only plastically deformed. If fuel elements with a low residual burn-up (or at least with a mass of still fissile material which is lower than the mean of the corresponding masses of all the fuel elements of the core) are arranged at the edge of the core, as is provided for in the abovementioned "low leakage" loading, during reactor operation a fast neutron flux distribution at which the flux density at the edge is low is generated, with the result that the fuel elements at the edge are elastic and present little creep.

Therefore, the forces, which are exerted at the edge of the core by a row of fuel elements, act toward the interior of the core. An equilibrium state with the desired effect described above is achieved if the outer fuel elements are bent outward. Therefore, according to the invention, irradiated fuel elements which are already correspondingly bent are deliberately inserted at the edge of the fuel element from the start of the new operating cycle.

In this context, a fuel element is referred to as "bent" if its vertical center axis is bent approximately in a C shape; (this represents the normal shape of an irradiated fuel element). Accordingly, the "maximum extent of the bending" denotes the distance of the apex of this C-shaped center axis from the center axis of an unbent fuel element used at the same position, and the "mean bending" denotes the mean of the distances of all the points on the C-shaped center line. These definitions can also be transferred to other forms of bending in which a C-shaped bend is adjoined at the upper and/or lower end by a significantly less extensive bending in any direction.

A fuel element position lies "at the edge of the core" if the fuel element used in this position has a side which is adjacent to a fuel element inserted in the core at another position, and the side of the fuel element which is on the diametrically opposite side from this side is not adjacent to a fuel element inserted at a fuel element position of the core.

The invention does not rule out the possibility that some fuel elements at the edge of the core may not be bent or at least do not have any pronounced maximum extent of the bending. In any event, however, the invention provides for a group of bent fuel elements, with all the fuel elements at the edge whose maximum bending is above a certain limit value forming this group and being oriented in the manner indicated.

If the degrees of bending of the fuel elements intended for the edge differ very considerably, it is preferable for the fuel elements which are bent to approximately the same degree to be distributed approximately equidistantly over the edge. However, it may also not be a problem if individual positions at the edge are occupied by fuel elements which are virtually unbent.

A preferred mode of the invention, includes the step of providing, in accordance with the loading plan, fuel elements having a reactivity below a mean reactivity of the reactor core in positions at the edge of the reactor core.

Another mode of the method according to the invention, includes using bent fuel elements in fuel element positions adjacent to fuel element positions at the edge of the reactor core, and orienting the bent fuel elements such that a respective bending of the bent fuel elements faces the edge of the reactor core. In other words, it is preferable for bent fuel elements with a bending oriented in the same direction to be inserted in fuel element positions which are adjacent to an edge position.

With the objects of the invention in view there is also provided, a reactor core configuration for a freshly reloaded pressurized water reactor, including:

a reactor core including fuel elements, the reactor core having an outer side and having an edge, the reactor core having fuel element positions at the edge; and irradiated and bent ones of the fuel elements being disposed at the fuel element positions at the edge of the reactor core, the irradiated and bent ones of the fuel elements disposed at the edge of the reactor core having a respective maximum extent of bending, and the irradiated and bent ones of the fuel elements disposed at the edge of the reactor core being oriented such that the respective maximum extent of bending is at the outer side of the reactor core.

In other words, the invention provides a core of a freshly reloaded pressurized water reactor, in which irradiated and bent fuel elements are inserted in fuel element positions at the edge of the core, wherein these fuel elements at the edge are oriented in such a manner that the maximum extent of their bending lies on an outer side of the core.

According to another feature of the invention, the reactor core has fuel element positions adjacent to the fuel element positions at the edge; and each of the fuel element positions at the edge and the fuel element positions adjacent to the fuel element positions at the edge is assigned a fuel element having substantially no bending or a fuel element having a bending facing away from the reactor core.

According to yet another feature of the invention, each of the fuel elements disposed at the edge of the reactor core has a respective fissible mass below a mean value of fissible mass of all of the fuel elements of the reactor core.

It is crucial that the fuel elements inserted at the edge should be inserted in such a way that the maximum extent of their bending does not face the core interior, if indeed they have a pronounced maximum extent of the bending. Therefore, should a fuel element be bent in such a manner that the maximum extent of the bending of its vertical center line does not lie on one of its four sides, but rather on a corner between two sides of its square cross section, it should be ensured that at least one of these two sides is an outer side of the core (i.e. does not adjoin any further fuel element). A fuel element which is oriented in this manner is also described as a fuel element of which the maximum extent of bending lies on the outer side of the core.

Other features which are considered as characteristic for the invention are set forth in the appended claims.

Although the invention is illustrated and described herein as embodied in a method for assembling a pressurized water reactor core, and a correspondingly refueled core, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
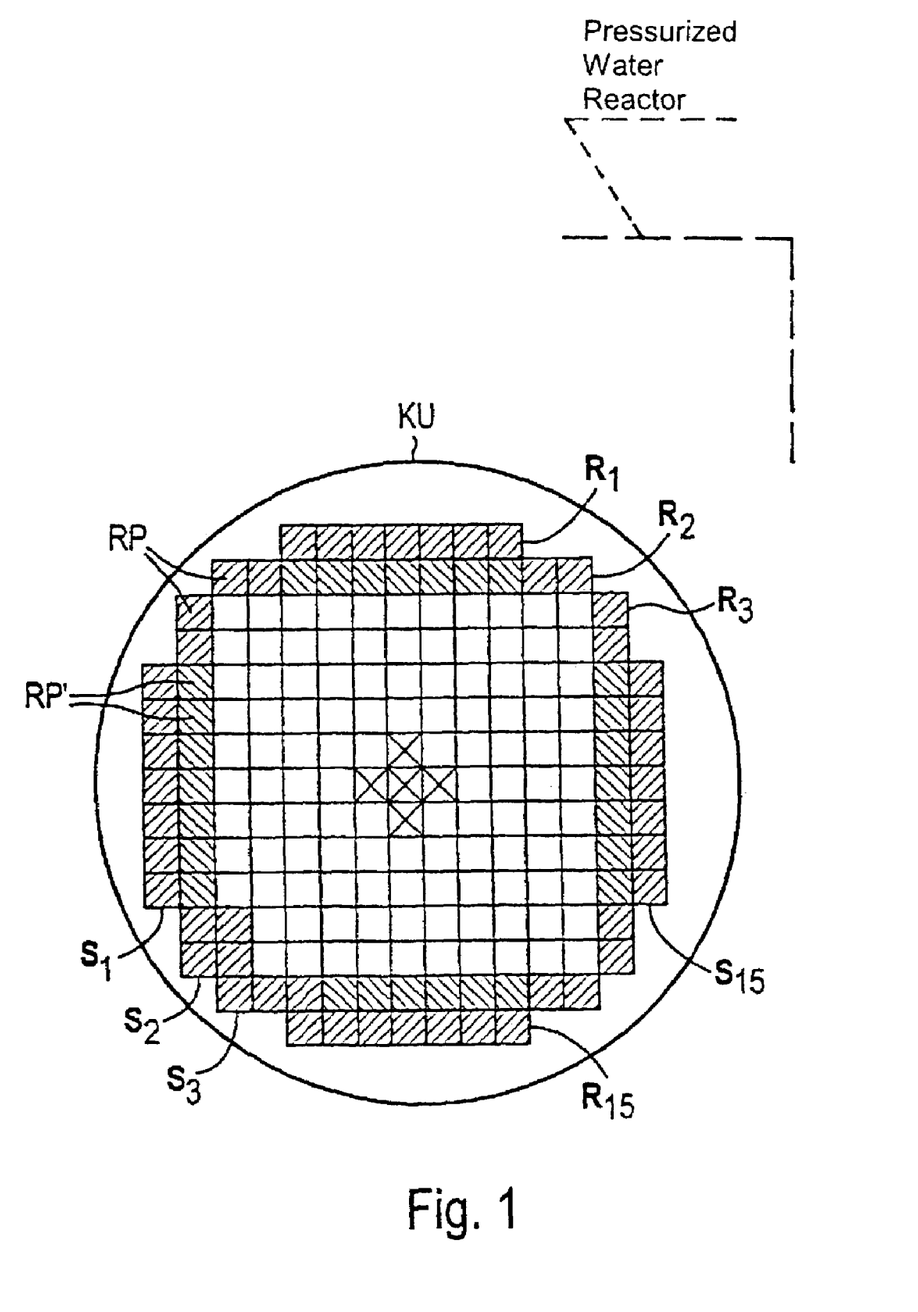
FIG. 1 is a diagrammatic cross-sectional view of a core of a pressurized water reactor according to the invention.

Referring now to the figures of the drawings in detail and first, particularly, to FIG. 1 thereof, there is shown a core which includes 15 rows R1 to R15 and 15 columns S1 to S15 which are perpendicular to the rows, including fuel element positions. According to the loading plan, a fast neutron flux of approximately $1 \cdot \exp 13$ (or $3 \cdot \exp 14$)/(sec·cm$^2$) is generated at the positions RP at the edge of the core (or at the positions RC in the center). For this purpose, the positions RP and the adjacent positions RP' are occupied by irradiated fuel elements or fuel rods which have a relatively low residual burn-up, while at least a plurality of other positions, in particular positions RC, are occupied by fresh, highly active fuel elements. The entire core is surrounded by a core shroud KU within the reactor pressure vessel. The pressurized water reactor is only indicated by a dashed line in FIG. 1.

Figure 2:
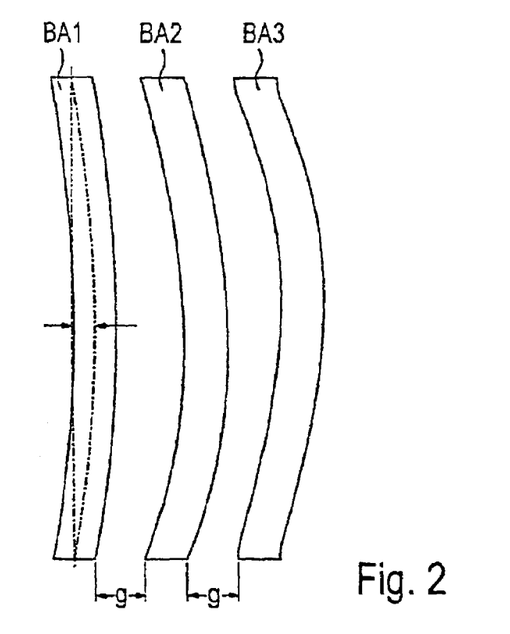
FIG. 2 is a diagrammatic side elevational view of three fuel elements positioned next to one another in an irradiated core.

The loading plan has as its objective optimized conditions at operating temperatures and assumes that the bottom fittings of the fuel elements will be anchored at a standard distance from one another on the lower core support grid and project rectilinearly upward, resulting in a gap of constant standard width g (in this case: g=1 mm). FIG. 2 illustrates three irradiated and therefore bent fuel elements BA1, BA2, BA3 which are arranged next to one another and have initially been bent in the same direction but with different mean bending, with the result that in longitudinal section the gaps equate to a concave-convex lens.

The length of the fuel elements is approximately 4 m, with the result that a maximum bending of 4 mm requires a high mechanical strength. Bending of this level and even above is frequently observed. For example, fuel elements which were bent 4 mm to one side at the start of the cycle have reached bending of 6 mm toward the other side within a single cycle.

Figure 3:
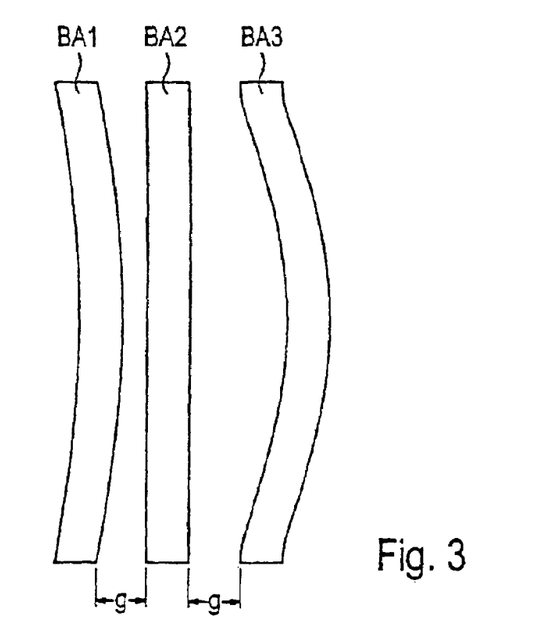
FIG. 3 is a diagrammatic side elevational view of fuel elements corresponding to the situation shown in FIG. 2 after the middle irradiated fuel element has been replaced by an unbent, fresh fuel element.

On account of the concave-convex longitudinal section, the mean of the gap width differs much less from the standard width g. However, this situation changes if the middle fuel element is replaced by a fresh fuel element or at least a virtually straight fuel element, as shown in FIG. 3. Since their widths are now very different, the gaps on both sides of the straight fuel element produce an anisotropy, which can lead to the intended power being greatly exceeded.

Figure 4:
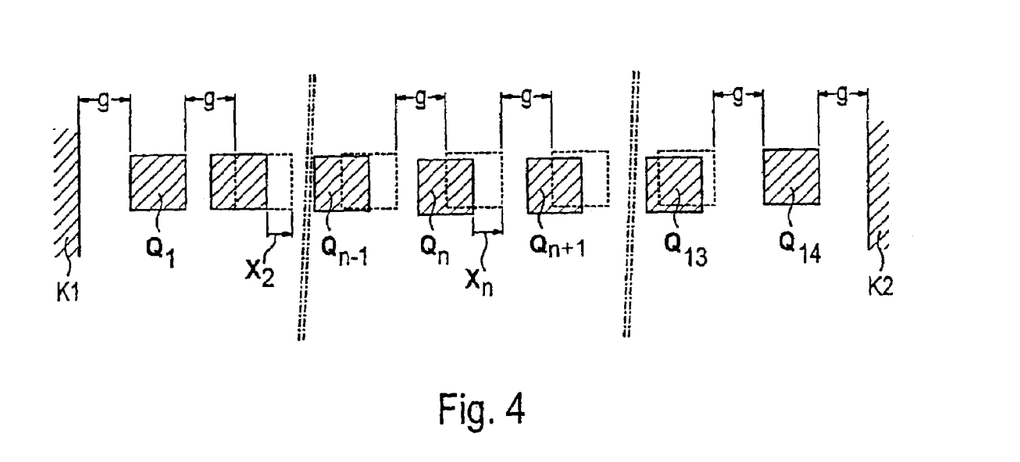
FIG. 4 is a diagrammatic sectional view of an exemplary row of 14 fuel elements disposed transversely across the core.

For a model calculation, FIG. 4 considers a row of fuel elements $Q_1$ to $Q_{14}$ which runs between the walls K1 and K2 of the core shroud. The position of the fuel elements is given by the standard position of the fuel element bottom fittings, in which all the distances are assumed to be equal to g. The model considers a section approximately halfway up the elements, where the elements $Q_n$ (n=1, ..., 14) have a degree of bending $X_n$. For the statistical equilibrium, the following assumptions are made:

Fuel Element $Q_1$:

$$F_1 + F_{k,1} + \alpha \cdot (g - X_2 - X_1 - g - X_1) - C \cdot (X_1 - X_{1,0}) = 0$$

Fuel Element $Q_n$:

$$F_n + F_{k,n} + \alpha \cdot (g - X_{n+1} - X_n - g - X_n + X_{n-1}) = 0$$

Fuel Element $Q_{14}$:

$$F_{14} + F_{k,14} + \alpha \cdot (g - X_{14} - g - X_{14} + X_{13}) - C^* \cdot (X_{14} - X_{14,0}) = 0$$

The cooling water exerts an overall external force on the elements which acts in the radially outward direction in the core and which experience has shown to be approximately 30 N in the center of the core and to disappear altogether at the edge ($Q_1$ and $Q_{14}$). If the fuel element abuts anywhere, a contact force $F_{k,n}$ occurs. Hitherto, contact of this type between the fuel elements has been only rarely observed, since it appears that there is an interaction between the fuel elements and the cooling water which is such that the gaps between the elements are increased in size if they are smaller than the mean gap width and are reduced in size if they are larger than the mean gap width (with the geometry of the model used, the mean gap width is inevitably equal to the standard width g). This interaction may explain many findings which cannot otherwise be explained; in the model, it is assumed that this force is proportional to the difference in the gap widths on either side of the fuel element. The corresponding interaction parameter $\alpha$ is equated to the value 50 N/mm, which—in accordance with experiments and experience—for adjacent gaps of $\frac{1}{5}$ mm results in a force of 400 N.

Furthermore, experience and measurements have made it possible to conclude that the fuel elements in the region of the high neutron flux in the center of the core no longer have any elasticity (they are "frozen in place") and then only present plastic deformation, which is possible as a result of the higher neutron density and is in equilibrium with the external forces. In the region of low flux density (i.e. at the edge), the corresponding plastic bending $X_{1,0}$ and $X_{14,0}$ of the fuel elements $Q_1$ and $Q_{14}$, which was already part of these irradiated fuel elements at the start of the operating cycle, does not change significantly, but in this region it is necessary to take account of the elasticity, for example through the use of a parameter C representing the rigidity (C=250 N/mm).

However, the equilibrium state of the core is, overall, evidently only dependent on the overall external forces $F_n$ and the plastic bending $X_{1,0}$ and $X_{14,0}$ which was already present in the outer fuel elements at the start of the cycle.

Figure 5:
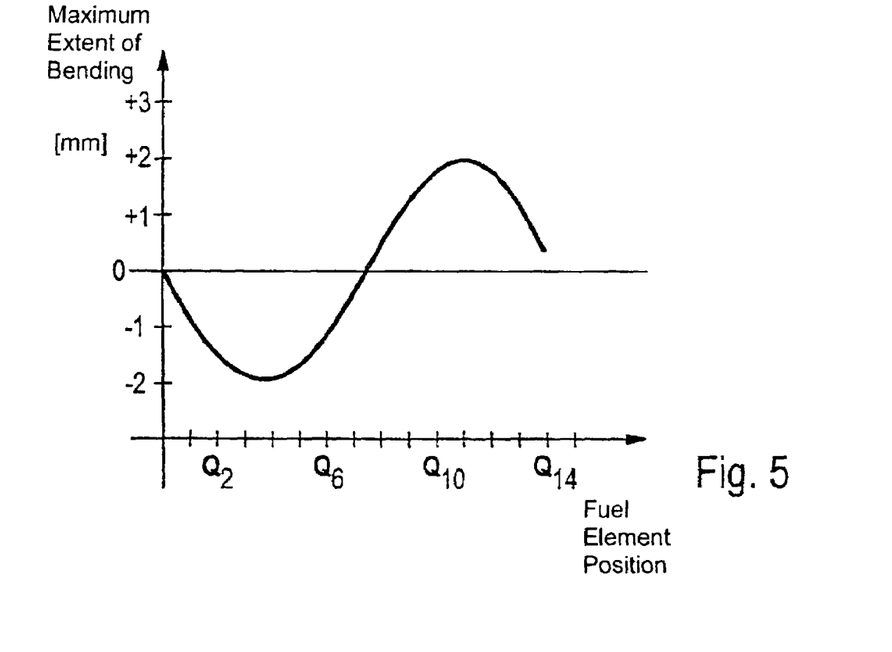
FIG. 5 is a graph illustrating the maximum extent of the bending of the fuel elements shown in FIG. 4 in the equilibrium state as a function of their position, calculated from a first set of initial bending values corresponding to a fresh core.

If unbent (i.e. fresh) fuel elements are inserted at the edge, accordingly $X_{1,0}$ is set to be equal to zero and $X_{14,0}$ is set to be equal to zero. The results of the calculation are shown in FIG. 5 for the bending $X_n$ of the fuel elements $Q_1$ to $Q_{14}$ at the end of the cycle: the elements are all bent, with the elements $Q_1$ and $Q_{14}$ at the edge bent least. Starting from the center of the core, the bends on both sides are of the same magnitude but with opposite signs (directions); they are directly radially outward.

Figure 6:
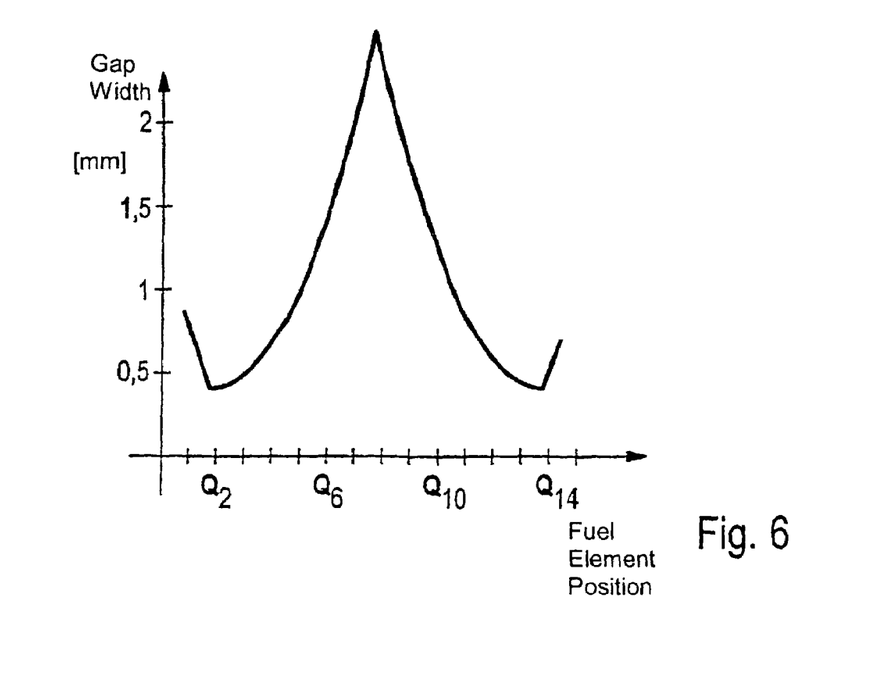
FIG. 6 is a graph illustrating the width of the gaps between the fuel elements, derived from the equilibrium state calculated for FIG. 5, as a function of their position.

As shown in FIG. 6, the gaps $GP_{0/1}$ (between the wall K1 and the element $Q_1$) and $GP_{14/0}$ (between $Q_{14}$ and K2) are practically equal to the standard width g, and at the middle gap $GP_7$ (between fuel elements $Q_7$ and $Q_8$), the mean gap width G reaches a maximum value $G_{max}$=approx. 2.5·g (i.e. just under 2.5 mm).

$X_{1,0}$=4 mm, $X_{14,0}$=0 mm means that the fuel element $Q_1$ (representing the majority or all of the fuel elements on this side of the core edge), at the start of the cycle, in accordance with its prior history, is bent 4 mm toward the other edge of the core. The corresponding fuel element $Q_{14}$ on the other side of the edge of the core is assumed to be straight. The calculation results are presented in FIG. 7 and FIG. 8: all the bends have the same sign, i.e. all run in the same direction (unlike with the radially symmetrical distribution shown in FIG. 5). A behavior of this nature is realistic and has been observed in many cores at the end of a cycle. The edge fuel element $Q_{14}$ which was already bent at the outset presents the maximum bending. The maximum gap width $G_{max}$ also occurs at this edge of the core. It is 4.2 mm.

However, if the bent edge fuel element $Q_1$ is inserted with its bending oriented oppositely (i.e. rotated in advance through 180° about its longitudinal axis), $X_{1,0}$=−4 mm and $X_{14,0}$=0 mm. Therefore, the bending now points outward, as is provided for in the invention. The result (FIGS. 9 and 10) now no longer has the orientation "all in one direction", as is the case in FIGS. 7 and 8, but rather once again has a radial symmetry, as with a fresh core (FIGS. 5 and 6). This radial symmetry is therefore also generated in the mirror-image situation where $X_{1,0}$=0 mm and $X_{14,0}$=4 mm, in which the fuel element $Q_{14}$ is bent in the opposite direction (i.e. out of the interior of the core).

Figure 9:
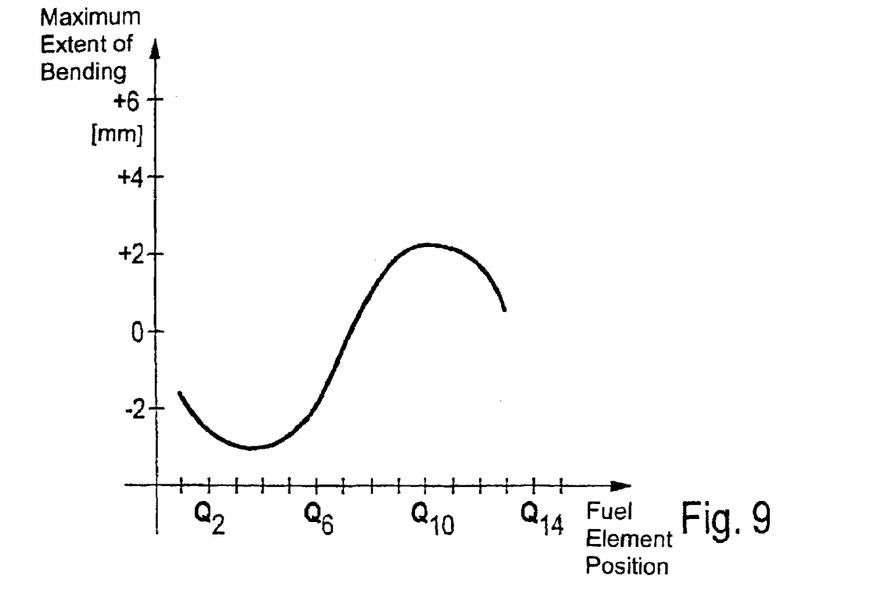
FIGS. 9 and 10 are graphs illustrating the values corresponding to FIGS. 5 and 6 for an equilibrium state calculated from a third set of starting values, this third set of starting values demonstrating the effect of the method and core according to the invention.
Figure 10:
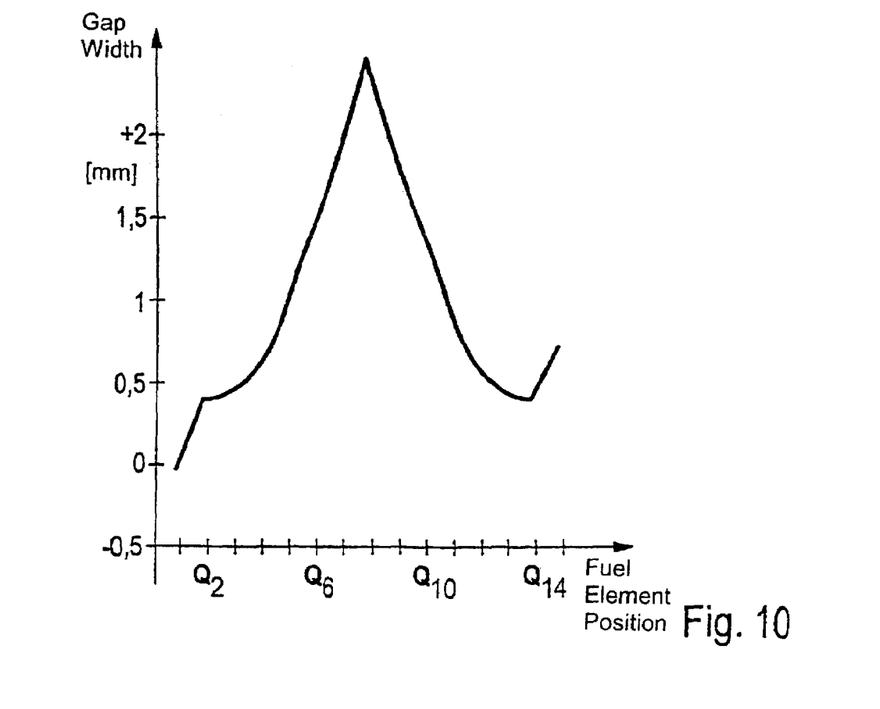

Therefore, the conditions shown in FIGS. 9 and 10 very much also apply when $X_{1,0}$=−4 mm and $X_{14,0}$=4 mm, or, in general terms, if any bends which are present at the edge of the core are always oriented outward, as provided for by the present invention.

FIGS. 9 and 10 likewise appear realistic, since an equilibrium of this type, which has proven particularly resistant to bending, has in actual fact already been observed on at least one core. The recorded data about bending and gap widths at the end of the cycle and from the prior history of this reactor are consistent with the assumption that in this case irradiated fuel elements whose bends were oriented outward, leading to the behavior shown in FIGS. 9 and 10, were inserted into at least the majority of the fuel element positions at the edge of the core.

By comparing measurements, it is also possible to confirm the assertion derived from this model calculation that a qualitative transition from bending in the "radially outward direction" to bending "all in one direction" occurs if, for some edge fuel elements, the orientation of their initial bending is changed to a starting orientation which is merely rotated through 180°.

Figure 7:
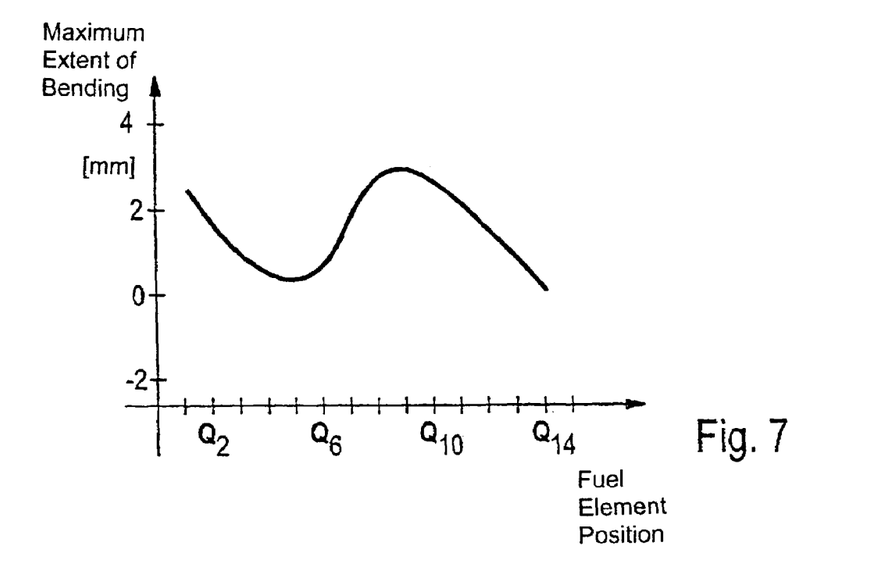
FIGS. 7 and 8 are graphs illustrating the functions corresponding to FIGS. 5 and 6 for an equilibrium state calculated from a second set of starting values.
Figure 8:
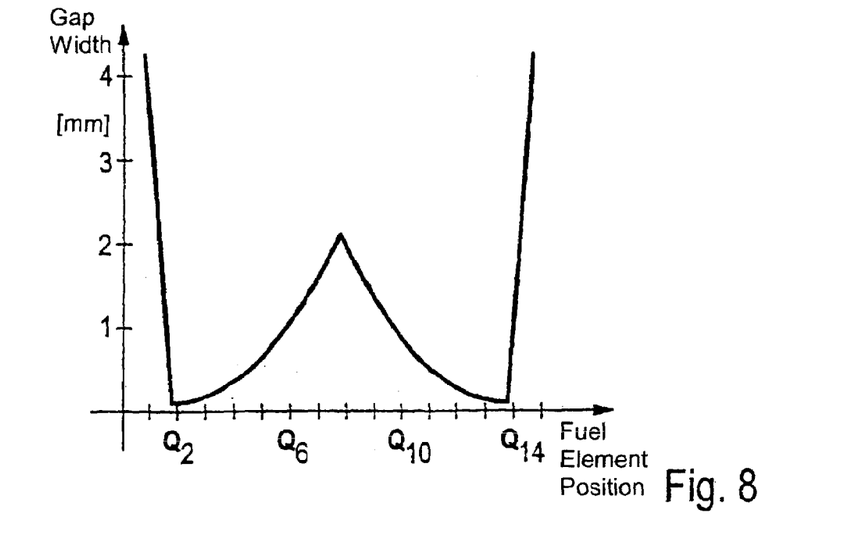

In accordance with FIG. 9, the maximum bending is reduced compared to FIG. 7, and even greatly reduced compared to the plastic bending which was already present at the outset, namely $X_{1,0}$=4 mm for the edge fuel element $Q_1$. Compared to FIG. 8, the maximum gap width $G_{max}$ (FIG. 10) is likewise reduced from approximately 4.2 mm (at the edge of the core) to approximately 2.5 mm (in the center of the core).

Figure 11:
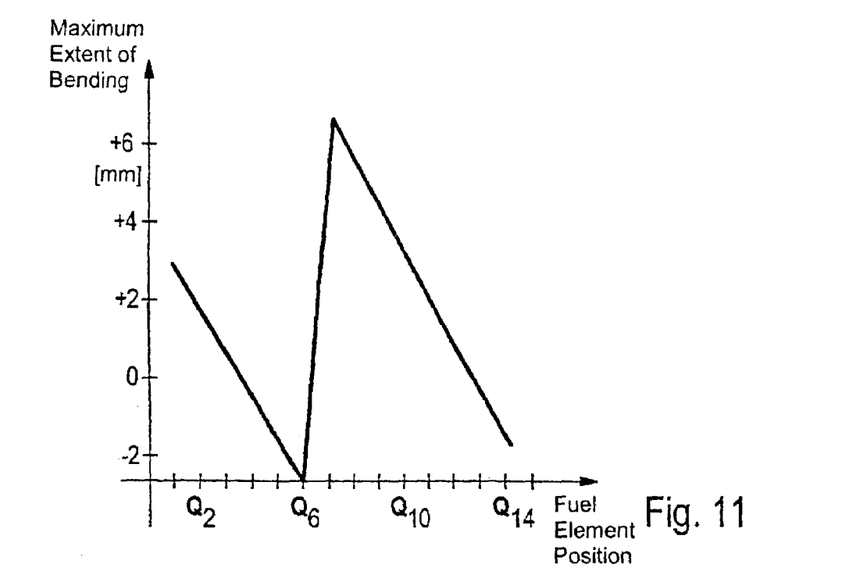
FIGS. 11 and 12 are graphs illustrating the functions corresponding to FIGS. 7 and 8 when the equilibrium state is calculated without taking account of the interaction between fuel elements and the water.
Figure 12:
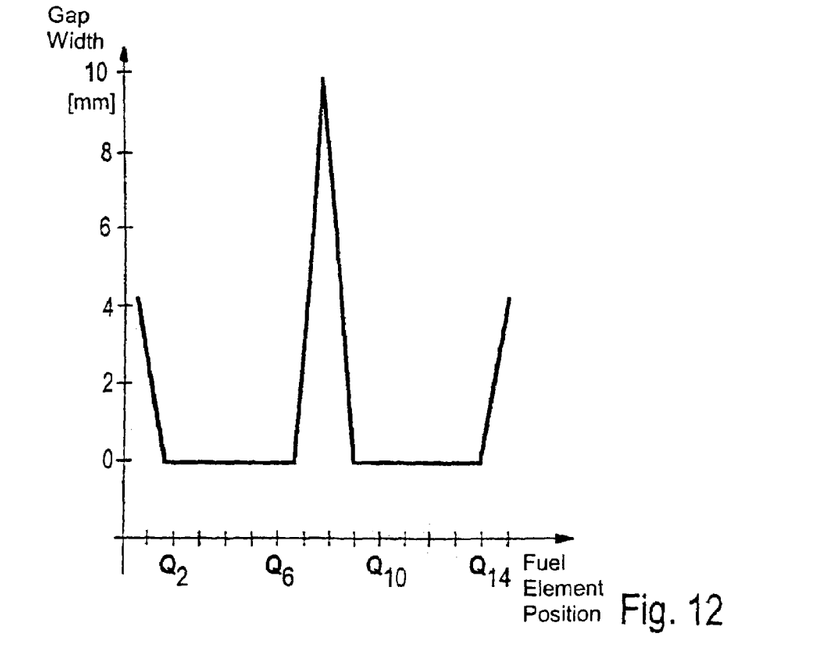

It appears crucial for the effects under consideration here that there be an interaction (in this case introduced into the model calculation by the parameter $\alpha$) between the skeletons of the fuel elements inserted and the cooling water flow. If this parameter is set to zero for $X_{1,0}$=4 mm and $X_{14,0}$=0 mm (i.e. the situation shown in FIGS. 7 and 8), the model calculation results in FIGS. 11 and 12, a behavior which has never been observed, while the observed behavior of many cores is similar to that shown in FIGS. 7 and 8.

To assemble the core in accordance with the invention, it is necessary to know the extent of bending of the edge fuel elements of the irradiated cores. Corresponding measurements can be carried out if the fuel elements whose residual activity appears suitable for reuse in accordance with the reloading plan are examined for defects in an inspection station, as has already been described in the patent literature. However, it is also possible for the fuel element to be moved past optical or ultrasound sensors, which scan its external dimensions (e.g. the position of its spacers) in the vertical longitudinal direction, at the time at which it is lifted out of the old reactor core and/or is then moved into the position provided for the new core.

Figure 13:
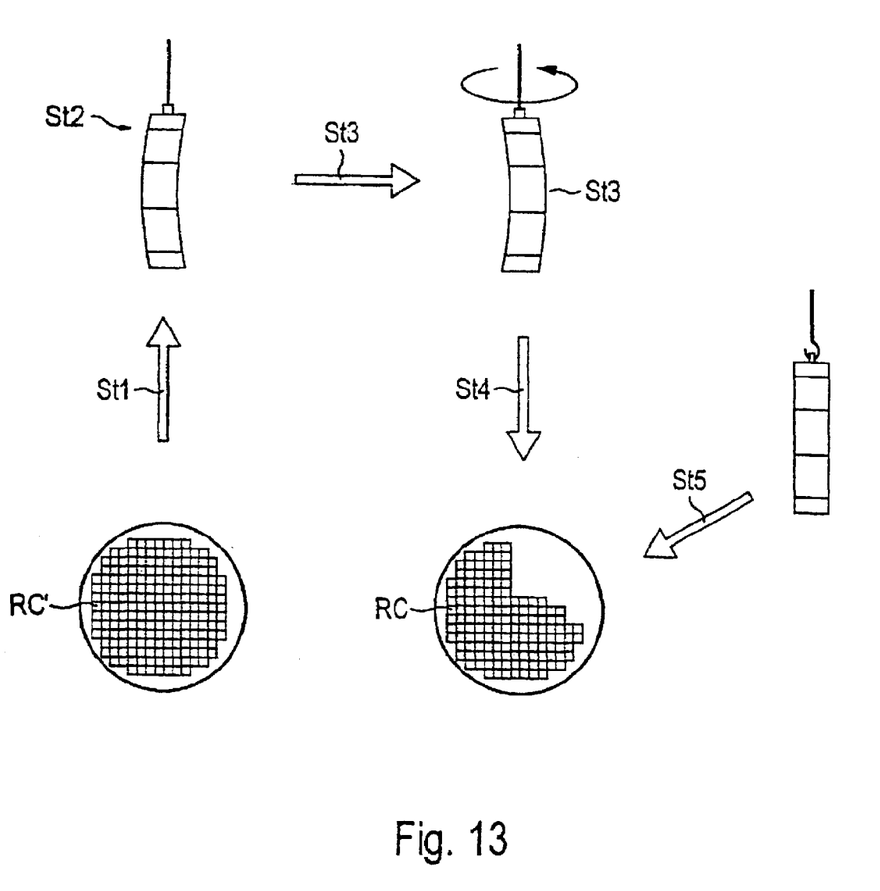
FIG. 13 is a process diagram illustrating the method according to the invention.

The overall result, then, by way of example is the method which is diagrammatically depicted in FIG. 13: after the reactor has been shut down and after the final operating cycle has ended, the fuel elements are, in a step St1, lifted out of the old reactor core RC' arranged inside the reactor pressure vessel through the use of a fuel element loading machine and, in a step St2, their bending is measured if they are to be reused at the edge of the new core which is to be assembled. In a step St3, the fuel elements are moved into the position which is provided for by the loading plan and in the process are if appropriate rotated about their longitudinal axis in accordance with the orientation provided for according to the invention. Then, they are lowered back into the reactor pressure vessel (step St4), namely onto the fuel element position in the new core RC to be assembled which is given by the loading plan. At the other positions of the new core, in some cases fuel elements which have also been removed from the old core and in some cases freshly produced fuel elements are inserted, as indicated by step St5.

As has already been mentioned, the equilibrium state which occurs in the cycle is dependent on the starting conditions with regard to the deformation of the edge fuel elements but not on the corresponding starting conditions in the interior of the core. Provided that the inner fuel elements still allow unimpeded descent of the control rods at least at the start of the cycle and can be inserted without problems between the adjacent fuel elements, they do not need to be regarded as defective and do not need to be replaced, but rather it can be expected that when the invention is employed (on account of the detected interaction with the cooling water) they will bend back to a tolerable extent. Therefore, there is no need to pay any attention to the bending of these fuel elements.

The model consideration also assumes that not all the edge fuel elements have to have a significant, outwardly directed bending. It does not appear to present any problems if some unbent dummy fuel elements or fuel elements with a low activity, which are not bent significantly (for example as a result of a repair which has been carried out for other reasons), are inserted at the edge, as is sometimes provided for reasons of equipment protection.

We claim:

1. A method for assembling a core of a reactor, the method which comprises:
   providing irradiated fuel elements for a reactor core of a pressurized water reactor, the fuel elements not having a channel box on their outer circumference;
   reusing the irradiated fuel elements in accordance with a given loading plan;
   inserting bent ones of the irradiated fuel elements at an edge of the reactor core; and
   orienting the bent ones of the irradiated fuel elements inserted at the edge of the reactor core such that a bent side of the fuel elements is oriented toward an outer side of the reactor core.

2. The method according to claim 1, which comprises providing, in accordance with the loading plan, fuel elements having a reactivity below a mean reactivity of the reactor core in positions at the edge of the reactor core.

3. The method according to claim 1, which comprises using bent fuel elements in fuel element positions adjacent to fuel element positions at the edge of the reactor core and orienting the bent fuel elements such that a bending of the bent fuel elements faces the edge of the reactor core.

4. A reactor core configuration for a pressurized water reactor freshly reloaded using the method of claim 1, comprising:
   a reactor core including fuel elements, said reactor core having an outer side and having an edge, said reactor core having fuel element positions at said edge; and
   irradiated and bent ones of said fuel elements being disposed at said fuel element positions at said edge of said reactor core, said irradiated and bent ones of said fuel elements disposed at said edge of said reactor core having a bent side, and said irradiated and bent ones of said fuel elements disposed at said edge of said reactor core being oriented such that said bent side is at said outer side of said reactor core.

5. The reactor core according to claim 4, wherein:
   said reactor core has fuel element positions adjacent to said fuel element positions at said edge; and
   each of said fuel element positions at said edge and said fuel element positions adjacent to said fuel element positions at said edge is assigned a fuel element selected from the group consisting of a fuel element having substantially no bending and a fuel element having a bending facing away from said reactor core.

6. The reactor core according to claim 4, wherein each of said fuel elements disposed at said edge of said reactor core has a respective fissible mass below a mean value of fissible mass of all of said fuel elements of said reactor core.

* * * * *